US006853309B1

(12) United States Patent
Schröter

(10) Patent No.: US 6,853,309 B1
(45) Date of Patent: Feb. 8, 2005

(54) SUPPLY METER AND METHOD FOR READING A FIXED SUPPLY METER

(76) Inventor: Michael Schröter, Timmersfeld 1, D-42899 Remscheid (DE)

( * ) Notice: Subject to any disclaimer, the term of this patent is extended or adjusted under 35 U.S.C. 154(b) by 0 days.

(21) Appl. No.: 10/019,908

(22) PCT Filed: May 6, 2000

(86) PCT No.: PCT/EP00/04043

§ 371 (c)(1),
(2), (4) Date: Nov. 13, 2001

(87) PCT Pub. No.: WO00/68643

PCT Pub. Date: Nov. 16, 2000

(30) Foreign Application Priority Data

| | | | |
|---|---|---|---|
| May 10, 1999 | (DE) | .................... | 199 21 357 |
| Sep. 7, 1999 | (DE) | .................... | 199 42 582 |
| Oct. 30, 1999 | (DE) | .................... | 199 52 083 |
| Mar. 17, 2000 | (DE) | .................... | 200 04 969 |

(51) Int. Cl.$^7$ ............................................. G08C 15/06
(52) U.S. Cl. ................... 340/870.02; 348/160; 705/412
(58) Field of Search ........................ 340/870.01, 870.02; 348/143, 160, 207; 705/412

(56) References Cited

U.S. PATENT DOCUMENTS

| | | | | |
|---|---|---|---|---|
| 4,680,704 A | * | 7/1987 | Konicek et al. | ............. 382/100 |
| 5,140,351 A | * | 8/1992 | Garcia et al. | ................ 385/117 |
| 5,559,894 A | | 9/1996 | Lubliner et al. | |
| 5,673,331 A | * | 9/1997 | Lewis et al. | .................. 382/100 |
| 5,870,140 A | | 2/1999 | Gillberry | |
| 6,621,943 B1 | * | 9/2003 | Yoo et al. | ..................... 382/317 |
| 2004/0027253 A1 | * | 2/2004 | Marsh et al. | ........... 340/870.02 |
| 2004/0032504 A1 | * | 2/2004 | Shan et al. | ............. 348/207.99 |
| 2004/0078350 A1 | * | 4/2004 | Hattori | ........................ 705/412 |

FOREIGN PATENT DOCUMENTS

| | | |
|---|---|---|
| DE | 40 00 266 A1 | 7/1991 |
| EP | 0 124 434 A1 | 11/1984 |
| EP | 0 841 635 A1 | 5/1998 |
| FR | 2696827 | 4/1994 |
| WO | WO 95/24022 | 9/1995 |
| WO | WO 95/27884 A1 | 10/1995 |

* cited by examiner

Primary Examiner—Timothy Edwards, Jr.
(74) Attorney, Agent, or Firm—Alston & Bird LLP

(57) ABSTRACT

An electronic image reader (9) is associated to a supply meter (1), for example a water meter, for measuring and displaying a measured value in an optically readable manner. This image reader is adapted for being positioned or guided in guide systems above an inspection window (3) of the supply meter. The image reader (9) is provided with an optical system, that includes a lens (7), which is adapted to the optical configuration of the inspection window and to the optical situation, in particular the geometric position of a display (2) behind the inspection window. The supply meter includes an identification mark (12), which is also located in the region of a guide system, namely guide rails (6.2, 6.3), and which is arranged relative to the guide system such that it can be read with the image reader without changing its optical system.

43 Claims, 10 Drawing Sheets

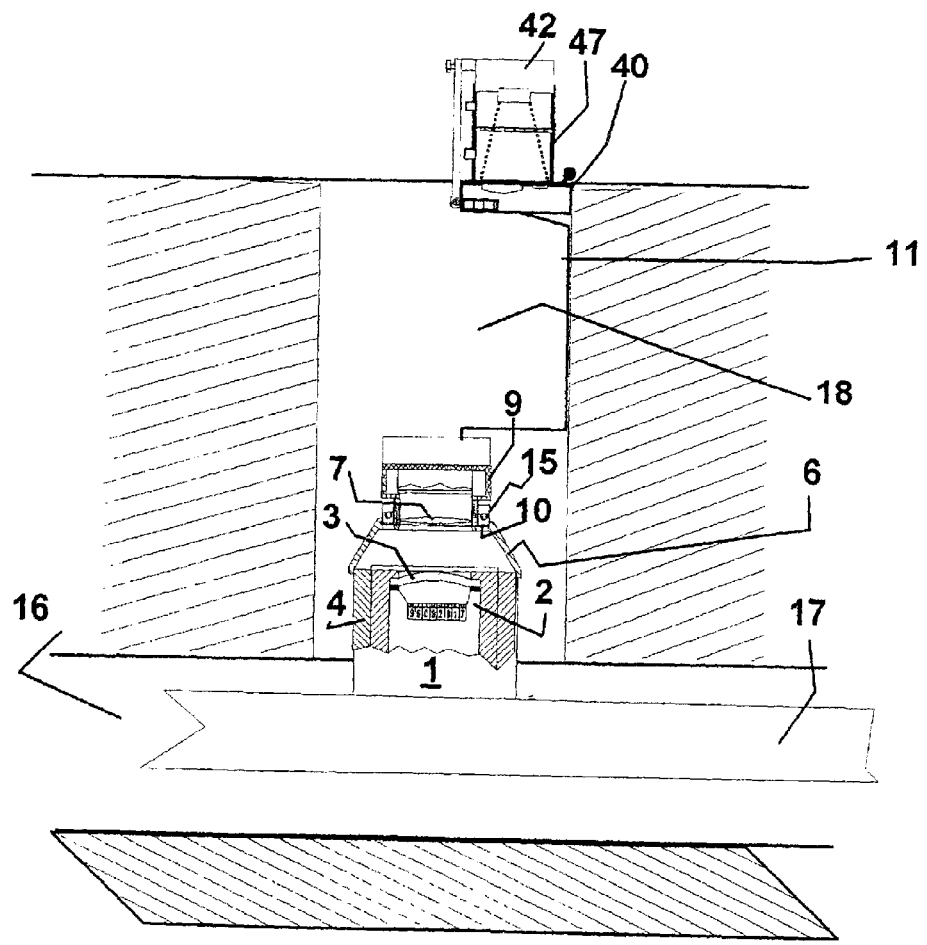

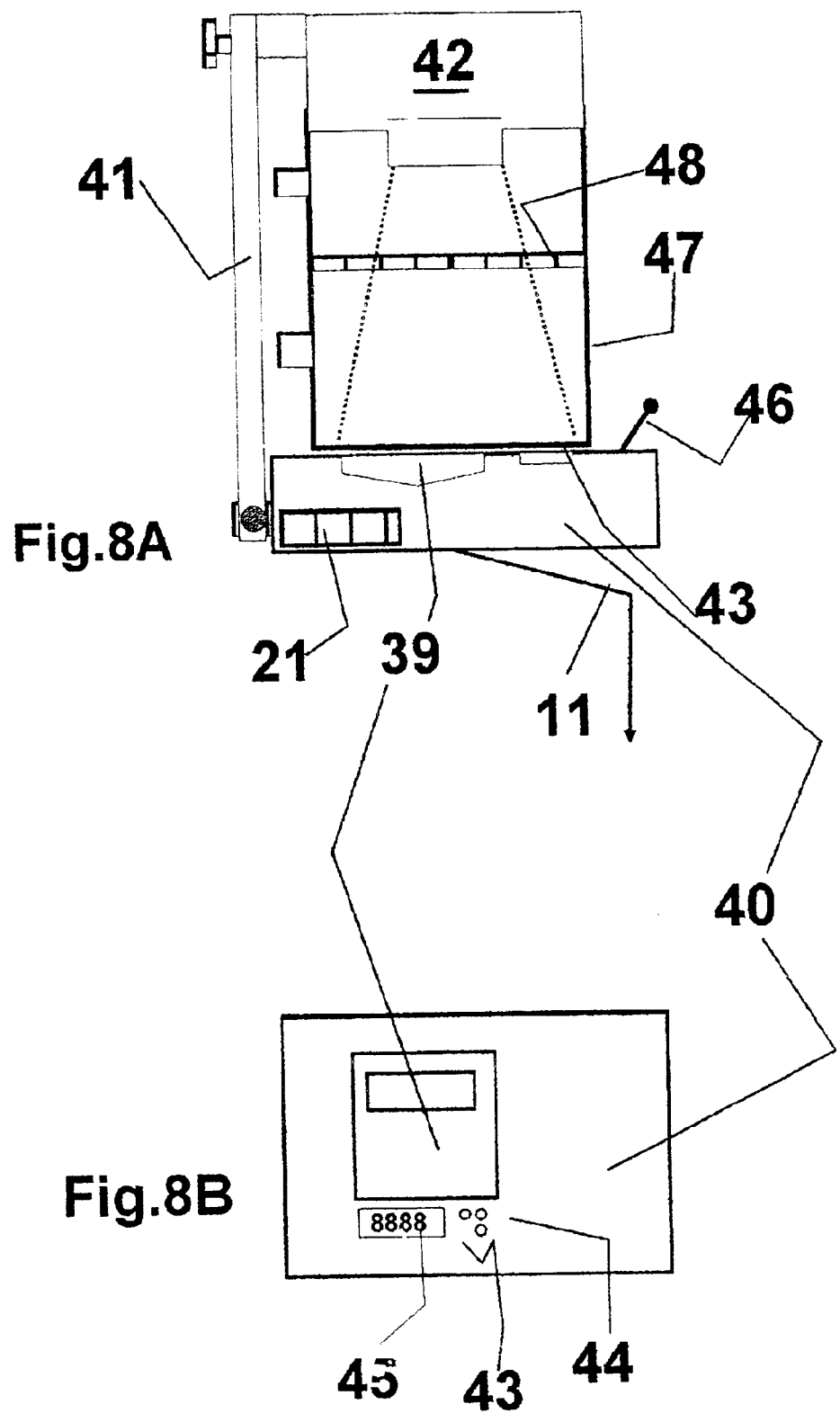

SUPPLY METER AND METHOD FOR READING A FIXED SUPPLY METER

BACKGROUND OF THE INVENTION

The present invention relates to supply meters and methods of reading stationary supply meters.

Supply meters are generally known and used for measuring, for example, the consumption of water. To determine the consumption, supply meters of this kind require an optical reading of numerals "by hand," and associating them to a consumer or a household. Since supply meters are rarely arranged in a place that is favorable for reading, the reading is time-consuming, at times very difficult, and even affected by unreliability.

SUMMARY OF THE INVENTION

One aspect of the present invention is the provision of an improved supply meter and method of reading the supply meter such that it is possible to determine the value of consumption in a simple, fast, reliable, and in particular independent manner from the local environmental situation of the supply meter.

In accordance with one aspect of the present invention, a supply meter, which is for measuring and displaying a measured value, includes an inspection window. An optically readable display of the measured value is provided by a counting mechanism that is behind the inspection window. The measured value is alphanumerically shown on the display. Further in accordance with this aspect, an electronic image reader is associated to the supply meter. The image reader is positioned above the inspection window by way of a guide system. The image reader includes an optical system that is adapted to the optical configuration of the inspection window and to the optical situation, in particular the geometric position of the display behind the inspection window.

The foregoing aspect has the advantage that it permits a cost-favorable determination of the value of consumption. Likewise, without further activity by a person, it is possible to obtain, with the use of data technology, the determined consumption values by an electronic computer, as well as to determine the consumption and to prepare the bill for the consumption automatically. The present invention provides suitable mechanical and optical adaptation that make it possible to use commercially available image readers for determining the consumption, thereby eliminating human sources of error.

A person may guide such image readers by hand. In this case, the reading head of these image readers has essentially the size of a hand (see, VDI Nachrichten, No. 12, Mar. 26, 1999).

The intended guide system of the image reader permits arranging the image reader, in particular a digital camera, above the display window of the supply meter such that it is possible to recognize fully and read simultaneously all numerals of the consumption rate or other characters and marks being read from the display window, such as in particular an identification number, which is assigned to each consumer or household.

The guide system that is provided to this end may be, for example, a template placed on the image reader, in which the image reader is arranged or laterally movable, depending on the size of the detection range of the image reader. The template is adapted to the supply meter such that it can be placed on the supply meter only in very specific positions, and that, as a result, the image reader is arranged above the inspection window of the supply meter only in a very specific direction, or that it can be guided over the inspection window of the image reader.

Thus, the invention proceeds from the recognition that a reliable reading and errorless recognition of the numerals and characters appearing in the inspection window of the supply meter will be ensured with the use of a digital image reader only when the image reader is adapted in an optimal manner, by means of an adapted guide system in a defined position with an always identical display field, to the sizes, colors, and contrasts, and other visual conditions, as well as to light conditions.

In accordance with one aspect of the present invention, the guide system is arranged on the image reader and includes an adapter, which permits the guide system to be placed on the supply meter for positioning the camera. As a result, even in the case of conventional supply meters, it is possible to produce the combination of supply meter, guide system, and image reader in a manner that provides for the reading operation of the present invention. In this connection, the guide system may be mounted to the image reader. It is not necessary that a guide system be rigidly arranged on each supply meter.

For example, the guide system may be guide rails, which are arranged above the inspection window of the supply meter. In this instance, the reading head of the image reader is designed and constructed such that it is guided in or on the guide rails in a certain direction and position.

In accordance with one aspect of the present invention, the guide system is a frame with one end adapted to the meter in the region of the viewing area and placed thereon. The other end of the frame mounts or is adapted to receive the image reader. In accordance with this aspect, the image reader is a camera. The frame produces a predetermined spacing between the camera and the viewing area of the supply meter, as well as an alignment of the optical system of the camera with the viewing field. This aspect has the advantage that the reading operation becomes largely independent of human influence and corresponding sources of human error. The viewing field is recorded as a whole in a single exposure step. The association of the read value of consumption to a certain household occurs in that besides the consumption value, all other data which are needed for determining the consumption of a certain household or consumer are recorded via optical systems and, if need be, with the use of data systems, and that they are electronically stored. This also includes identification marks, which are arranged on the meter in a tamperproof manner.

The optical systems of such image readers may very made highly photosensitive, so that it is possible to read at least the consumption values or identification marks in existing daylight or artificial light. In accordance with one aspect of the present invention, the image reader connects to a light source for illuminating the display of a consumption value and/or an identification mark. The light source is preferably mounted to the camera or to the guide system. Therefore, the reading reliability and reading accuracy are independent of environmental conditions and in particular of light conditions.

In accordance with one aspect of the present invention, the light source consists of a hollow-cylindrical light ring of a transparent or translucent material, which surrounds the optical system of the camera in a substantially concentric relationship. The light source also includes one or more light emitters that are arranged on the front side of the light ring facing the camera, for radiating into the light ring. The light ring preferably serves as at least a part of the guide system. This aspect permits a very uniform illumination, thereby ensuring readability and recognizability of the characters being read from the inspection window. Corresponding arrangements of the light emitters on the annular end face of the light ring make it possible to adjust the illumination of the viewing area according to requirements.

It is of special importance that the light beams be directed toward the supply meter in such a manner that the light beams are not reflected on the inspection window. This is accomplished by a predetermined configuration of the light ring. Additionally, a reflector can be positioned so that any light beams that are reflected by the inspection window do not return to the image reader in a manner such that they are wrongly interpreted by the image reader.

In accordance with one aspect of the present invention, is its possible to omit a special guide system. In accordance with this aspect, preferably the light ring and/or the reflector ring function as a guide system or at least as a part thereof.

For the recognizability of the numerals and other characters being read, it will be of special advantage when the image reader and light emitter or light sources are adapted to one another in a manner that allows for the utilization of a substantially monochromatic light or light of a limited wave range, in particular in the green or yellow range. In this instance, one may select wave lengths of the light which are especially low in reflection.

In accordance with one aspect, the present invention is used with water meters, which is particularly advantageous since water meters are often arranged in very unfavorable locations.

In comparison with supply meters of other media, a water meter has the unique characteristic that the counting mechanism and numerical scale are immersed in water. While this requires a special adaptation of the optical system, it also has the advantage that the counting mechanism is not susceptible to contamination. This also applies to the identification mark, when the identification mark is under the inspection window. In this instance, the inspection window may be constructed as a lens, primarily a weak lens, for purposes of improving the recognizability of numerals and other characters.

As aforesaid, the invention has the advantage that it also permits, via data systems, a further processing of the recorded consumption values or identification marks, since the image reader in its current marketable design records the determined numerals not only as an image, but also in digitized form. For the correct recognition and display of these images, and for the conversion of these images into alphanumerical characters, special marks may be used in the lines in which the values being read are located. For converting the images into alphanumerical characters, an OCR (optical character recognition) software is used.

The image reader, which is used within the scope of the present invention, is preferably a digital camera. It may also be a laser scanner, which scans the viewing area line by line in a predetermined and controlled sequence, with the light value of the recorded image points being stored in a reproducible manner.

The currently marketed image readers make it possible to show the read data on a display, so that, in accordance with one aspect of the present invention, the operator is able to enter the recorded data by hand into a written document.

One may avoid optical errors, inaccuracies, or ambiguities of the image provided by the image reader, such as by producing a clear black and white image of the viewing area when the image reader is connected to a computer, which clearly allocates each image point of the viewing area to a binary signal (black or white). Such a display has a definitions which is not realizable with merely optical means.

The use of a digital camera also has the advantage that when reading a display, the recording element of the camera shows the correct position. As a result of connecting the image reader to a computer, it is also possible to rotate the viewing area automatically during the reading, so as to enable a reading "by hand" and/or a comparison of the recorded characters with characters that are predetermined and stored in the computer. Likewise, by engaging the image reader and the guide system on the supply meter, it is possible to predetermine that the image reader has the correct alignment with the viewing area.

For monitoring the operation of the supply meter over a long period of time with little energy consumption, as well as for the safety and reliability of this monitoring, other aspects of the present invention are provided. For one of these aspects, the image reader is connected to a comparison device as well as to a computer and software, which permit detecting at predetermined time intervals the change of the image points of at least a partial area of the inspection window, in which a control wheel with markings or another moved surface with markings is arranged. For another of these aspects, the image reader includes a photosensitive photodetector, which is directed toward a control wheel with markings located in the inspection window, or another movable surface with markings, and a microprocessor connected thereto, which determines the frequency of the light pulses generated by the markings. For both of these aspects, the moving speed of the control wheel or other surface depends on the function of the supply meter and preferably on the amount of consumption. According to these aspects, this monitoring system is designed such that is does not adversely affect the reading of the consumption.

If an operator continues to read the supply meters, the reading will be simplified by the invention, and be made more reliable. However, it is also possible to include operations in the reading step that have previously had to occur subsequently by evaluating the read values. That is, in accordance with another aspect of the present invention, data systems are provided for the processing of the recorded consumption values and identification marks up to and including an automatic writing of bills.

In many cases, supply meters are arranged in inaccessible locations, for example, in chemical plants or manholes. In these cases, the reading of the consumption values is not only difficult, but also associated with hazards. A stationary installation of the image reader and the guide system on the supply meter, and the connection of the image reader to an associated computer, permit eliminating this problem.

With its different developments, the invention also enables a variable realization of the reading method. In this connection, different steps of automation are possible. One option is a continuous automation, including the evaluation of the consumption values and, if need be, preparation of bills.

BRIEF DESCRIPTION OF THE DRAWINGS

In the following, the invention is described with reference to embodiments shown in the drawings, in which:

FIGS. 8, 8*a*–b show the reading of consumption values, which originate in a manhole.

DETAILED DESCRIPTION OF THE INVENTION

Figure 1:
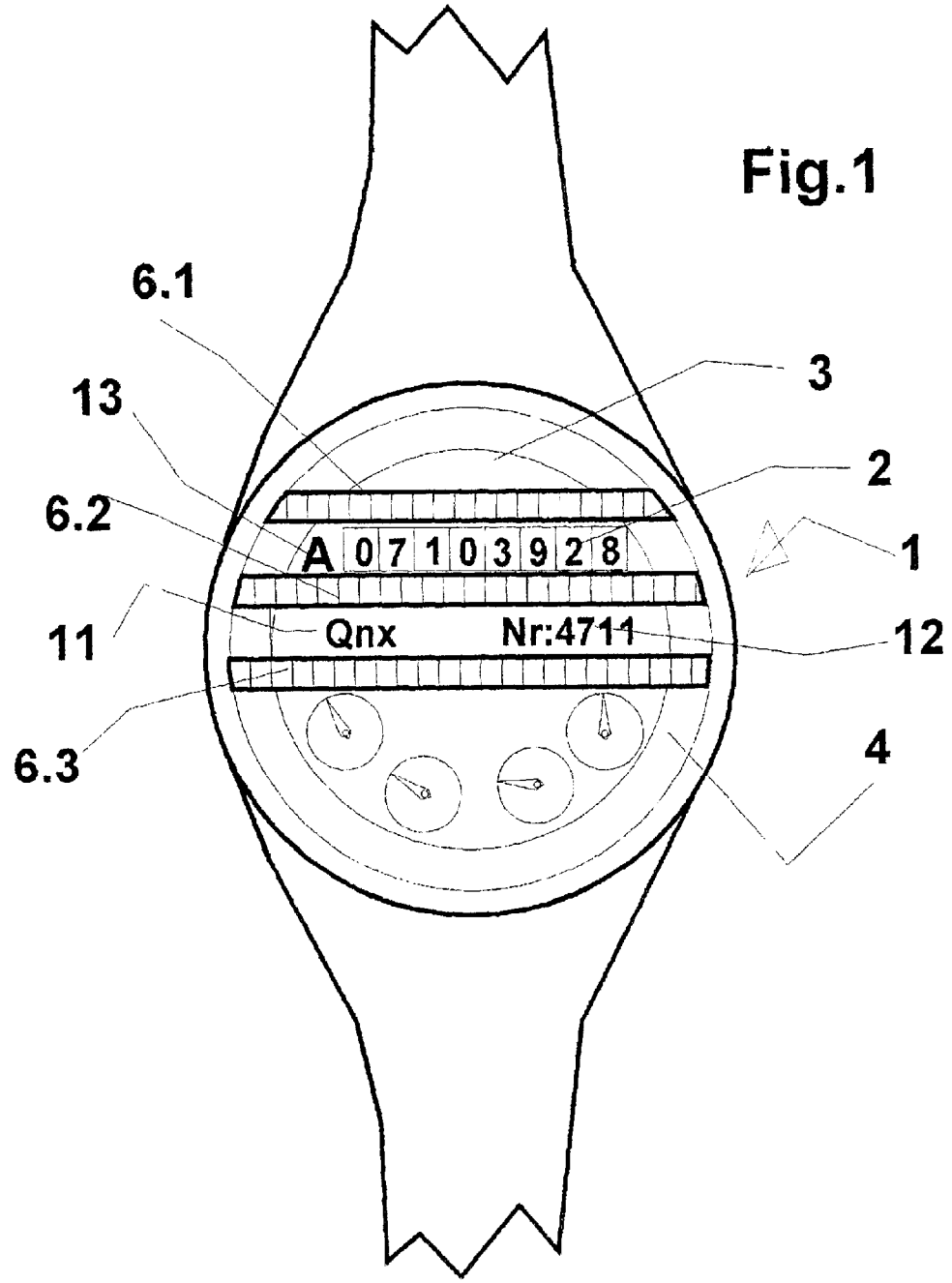
FIG. 1 is a view of a water meter.

The devices illustrated in FIGS. 1–9 are largely identical. In the following description, parts of identical function are provided with the same numerals. The following description applies to all Figures and embodiments, unless express reference is made to the differences.

A water meter 1 comprises a housing 4, which is upwardly closed, toward the viewing side, by an inspection window 3, and sealed by an annular seal or gasket 5. The housing 4 is flooded in water. The housing 4 accommodates a counting mechanism 2. This counting mechanism connects to measuring wheels (not shown) of the water meter. The inspection window is in the form of an optical lens, and designed and constructed such that it makes readily visible, in particular visible by enlargement, the number (count, consumption value) shown on the display (counting mechanism), and that it compensates for optical distortions, which arise due to the fact that the counting mechanism is immersed in water. Furthermore, the water meter 1 comprises an identification mark 12 shown by the number 4711. This identification mark is assigned to the water meter and its location, for example, a certain water consuming point. The identification mark (meter number) is used to be able to allocate the consumption value of a certain consuming point, which is read on the counting mechanism (display 2), to a certain consuming point, and, last but not least, to write a bill to a certain person.

The identification mark 12 is arranged on an identification sign, which cannot be removed, altered, or damaged from the outside. In the illustrated embodiment, the identification sign is likewise arranged in the water-flooded housing such that the identification mark 12 appears parallel to and in the vicinity of the consumption value shown on the counting mechanism, and that it can be simultaneously read with same.

Figure 2:
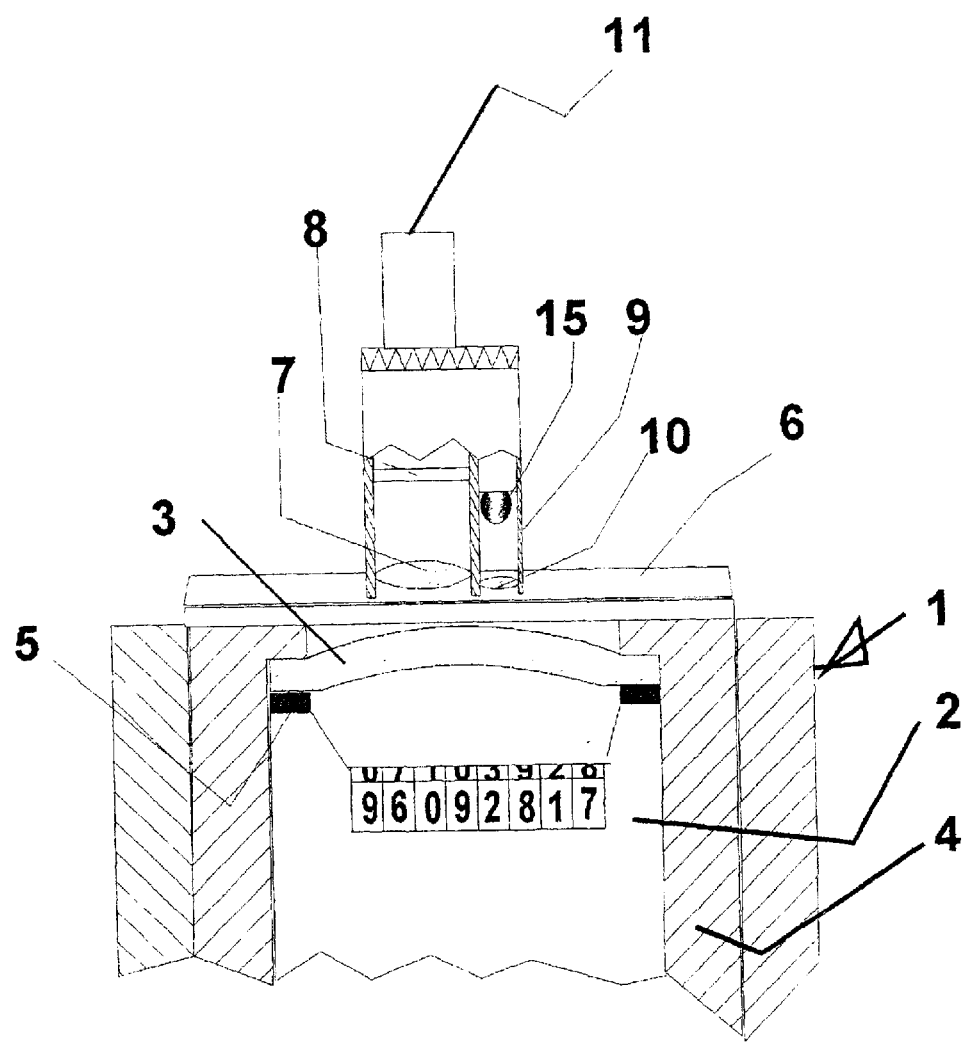
FIG. 2 is a partially sectioned view of a water meter with a sectional view of an image reader.

The following applies to the embodiment of FIGS. 1 and 2:

Above the inspection window, the edge of the housing mounts guide rails 6.1, 6.2, 6.3. Each pair of guide rails 6.1 and 6.2 is associated to the consumption value shown on the counting mechanism, and a further pair of guide rails 6.2 and 6.3 is associated to the identification mark 12. The guide rails 6.1–6.3 are made as V-shaped or T-shaped sections. Above the base of these sections, an image reader 9 may be guided. To this end, cross members adjacent to the guide rails 6.1 and 6.2 and 6.2 and 6.3, respectively, are arranged in such a spaced relationship that the image reader can be successively guided over the consumption value and over the identification mark, and in so doing record respectively the consumption value and the identification mark.

The necessary accuracy of the guidance depends on the one hand on the geometrical design of the head of image reader 9, and on the other hand on the aperture angle of the optical system. In the embodiment, the optical system of the image reader is shown only schematically and symbolically by a lens 7 and a photosensitive receiver 8. Such image readers are presently commercially available, and will therefore not be described in further detail.

Figure 3:
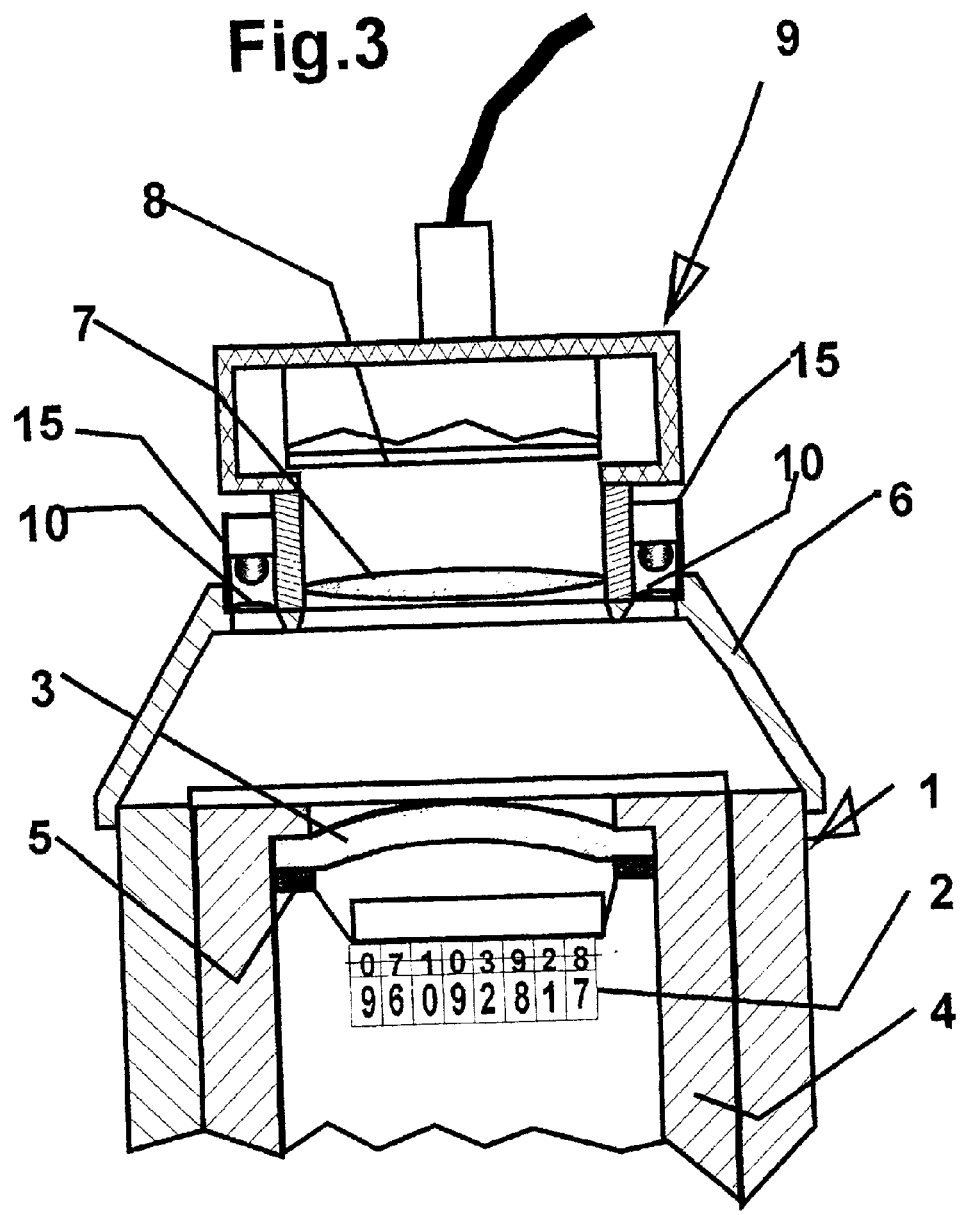
FIG. 3 is a partially sectioned view of a water meter with a sectional view of a camera.
Figure 4:
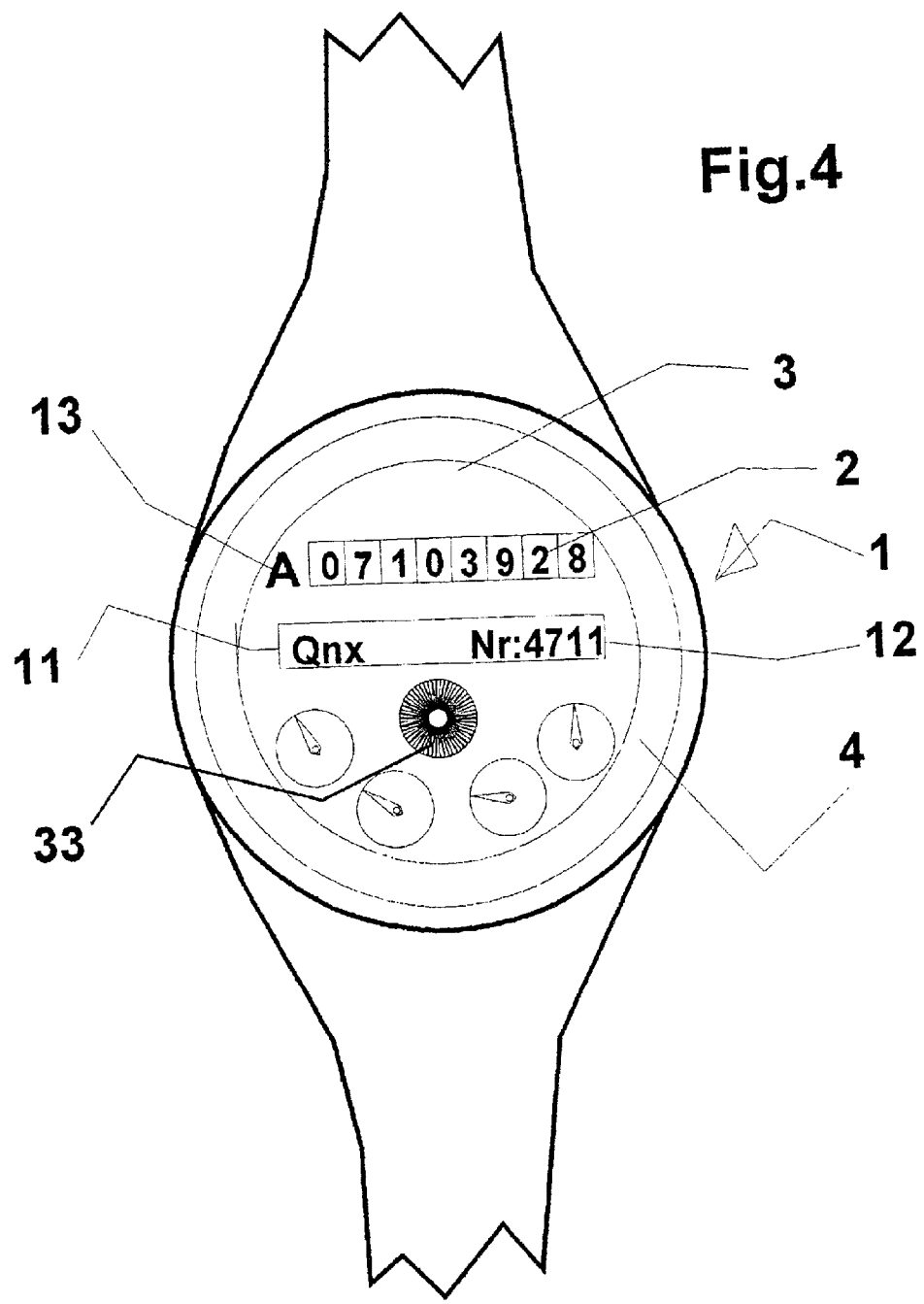
FIG. 4 is a view of a water meter of FIG. 3.

In the embodiment of FIGS. 3–4, the recording of the consumption value and identification mark occur by an image reader 9, which is realized as a camera. This camera 9 is able to record with a single adjustment the entire viewing field of the water meter 1. By means of a guide system 6, the camera is aligned with the viewing field, i.e. both display 2 and identification mark 12. The guide system 6 is a shell of a cylinder or frustum. The lower end face thereof is adapted to the outer contours of the water meter 1, and placed on the water meter. The upper end face is adapted to the contours of the camera or attachment for lens 7, and comprises in addition an aperture for two light sources 15 and the preceding focusing lenses. The guide system 6 may be an independent structural element, which is placed on the water meter, when needed, and which subsequently receives the camera. In this instance, it is possible to ensure the correct position, in particular the rotated position, by cooperating marks, notches, optical markings, or the like provided on the guide body on the one hand, and on the housing of the water meter or the camera on the other hand.

The guide system 6 may also be made integral with the water meter. In this instance, marks will be needed only on the pairing of the camera and guide body 6. On the other hand, the guide body 6 may also be made integral with the camera or lens attachment. In this instance, marks are provided only on the pairing of the cylinder body and supply meter.

The following applies to all embodiments:

The optical system of the image reader 9 is adapted to the optical system of inspection window 3; the spacing between the reading head with lens 7 on the one hand, and the inspection window 3 on the other hand; as well as the spacing between inspection window 3 and counting mechanism 2, in such a manner that it is possible to identify in a reliable manner, even under unfavorable conditions, the respective consumption value by means of the receiver and the electronic devices not shown in further detail. This means that the optical system of the image reader, the optical system of the inspection window, and the thereby visible counting mechanism, as well as the arrangement of guide rails 6.1–6.3 or guide body 6 must be adapted to one another.

A starting mark 13, in the present embodiment in the form of the letter A, is permanently arranged before the consumption value, which appears on the counting mechanism. The image reader is programmed in such a manner that the read consumption value is always read and displayed from the starting mark 13, irrespective of the direction, in which the image reader is moved along rails 6.1 and 6.2.

In the same way, the identification mark 12 is provided with a starting mark, in the present embodiment in the form of the letter combination NR. Likewise, this starting mark serves the purpose of putting by a corresponding programming, the image reader in a position to display the identification mark always in the correct direction. By a corresponding programming of the image reader, it is further recognized with reference to starting marks 13 and 14, which of them is the identification mark, and which is the consumption value. Thus, it does not matter whether or not the operator guides the image reader in a certain sequence, namely first over the consumption value, and then over the identification mark.

Furthermore, the type of counter can be made readable for the image reader by a marking, in the present embodiment: Qnx.

In the illustrated embodiments, the image reader is provided with one or two light sources 15 and a corresponding source of energy (not shown). Through the lens 10 or a corresponding optical system, the light strikes the consumption value or the identification mark such that it provides an always constant and optimally suitable illumination for the image reader.

Commercially available digital image readers and cameras now include program storages, or can be connected to program storages, which permit recognizing images, and which make the recognized images recognizable on a small display arranged on the image reader. Thus, the operator is in a position to read the read consumption value and the identification mark immediately. However, it is also possible to supply the read value, via a data line 11, to a small carry-on computer. In this computer, it is possible to convert the consumption value and the identification mark respectively into an alphanumerical signal. The computer may also store the result of previous readings as well as the owner of the consuming point. This makes it possible to convert the read data immediately into a bill to a certain person, and to issue it by means of a suitable printer.

In the embodiment of FIGS. 3 and 4, it will also be possible to place the guide body 6 and the camera in a randomly rotated position on the supply meter, when the computer connected to the electronic-digital camera has a suitable software, which permits rotating the read image (namely, first the read image of the consumption value and then the read image of the identification mark, if need be) to such an extent that the computer is able to identify the read-in image as a sequence of alphanumerical characters. As in the case of standard character programs, this rotation may be performed by hand. However, a corresponding programming makes it also possible to perform the rotation automatically, until the correct position is reached. The computer or software is able to recognize by a corresponding marking (for example, starting mark "A"), whether or not the correct position is reached. However, programming may also be such that the rotation is terminated when the computer recognizes that one of the read characters corresponds to a stored alphanumerical character. The computer is now able to convert the image of the consumption value and identification mark into the corresponding alphanumerical characters and to then evaluate the received signals.

The computer may be connected to the image reader of the first embodiment or the camera of the second embodiment by cable, cable and plug connections, or even by remote transmission, by radio, infrared, and the like.

The embodiment of FIGS. 3–4 makes it also possible to interconnect the camera, guide body 6, and supply meter 1 permanently. This will be especially suitable when the supply meter is located in manholes or other hard-to-access locations. In this instance, one may provide a remote control for actuating the camera and the light source. The remote control can be a cable or wireless, in particular via radio, ultrasound, or infrared. The output signals of the camera may then be supplied via a cable, or wireless, to the computer, which is located preferably always outside of the hard-to-access location.

Figure 5:
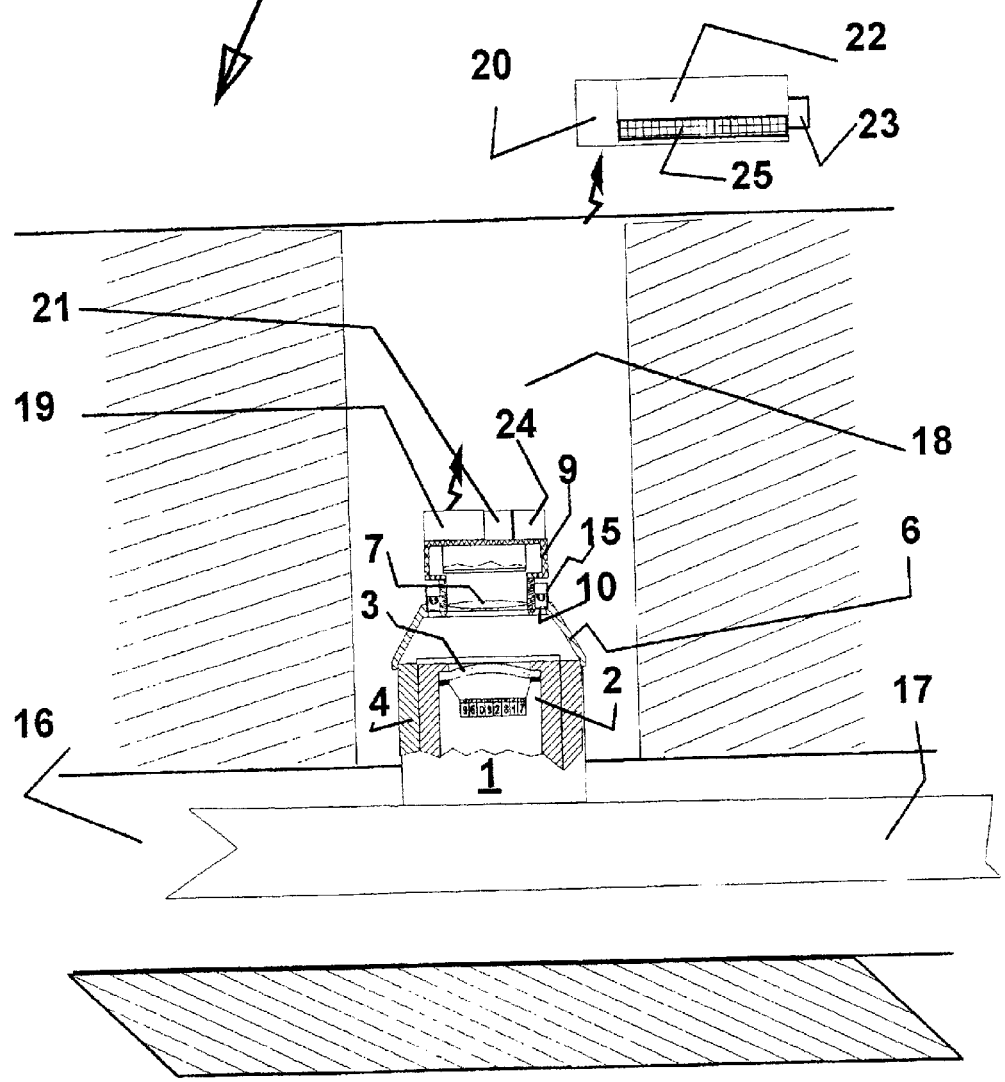
FIG. 5 is a cross sectional view of a supply meter with remote data transmission.

The embodiment of FIG. 5 shows that the supply meter of this invention can also very advantageously be used in hard-to-access locations. Shown is a water meter 1, which measures the flow through a line 17. The line 17 is laid in an underground tunnel 16. The tunnel is accessible through a manhole 18, which may also measure several meters deep. In the manhole, the water meter can be accessed. As is known, the access to such manholes is hazardous, since gases may accumulate in such tunnels and manholes, which lead to suffocation of the maintenance personnel. Consequently, the reading of water meters in such locations always requires two persons.

In the illustrated embodiment, the water meter is permanently equipped with an image reader 9, with a guide system 6 being interposed. The image reader includes a battery 21 as an energy storage. This battery is used to supply a radio set 19 and a remote releasing device 24. Both are permanently connected to the image reader. The contact from the operator to the image reader is made, for example, via a portable radio set 20, which is connected to a computer 22. The computer 22 is operated via a keyboard. In this manner, it is possible to input, for example, a code number for the water meter or the image reader, and to thus establish the connection to the image reader. The remote releasing device is to be actuated by radio contact, and in this way the consumption value is read by the image reader and transmitted to the computer.

Figure 6:
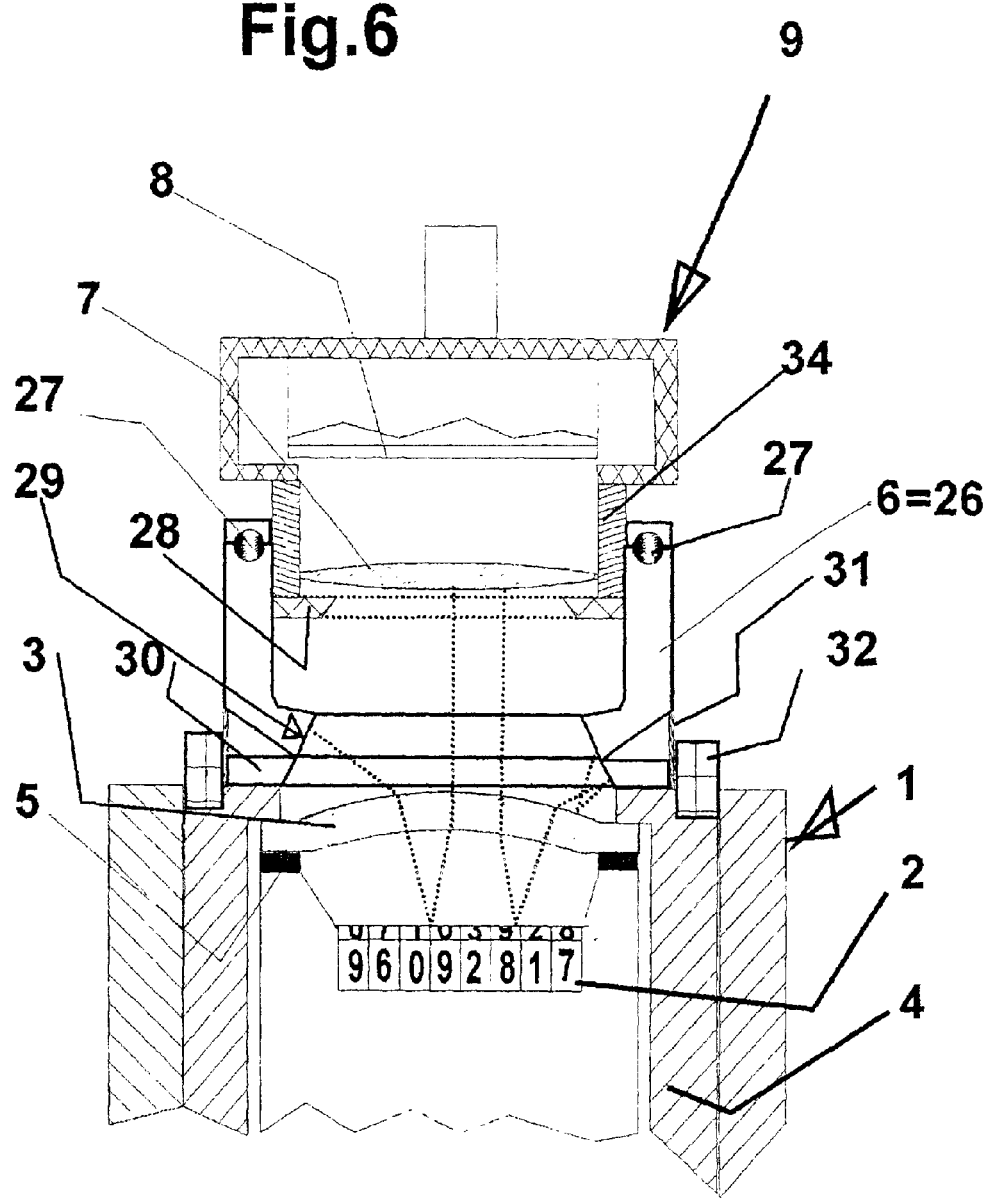
FIG. 6 is a cross sectional view of the optical system, the light ring, and the supply meter of an embodiment (partial)

The image reader of FIG. 6 permits illuminating the viewing field under the inspection window 3 of a water meter very uniformly and adapted to the conditions. In this embodiment, the guide system 6 is formed by a hollow-cylindrical holder 31. A plurality of light emitters 27 are distributed over the inner circumference of the holder. Below the emitters is a hollow-cylindrical light ring 26, and therebelow a reflection ring 30. Preferably, the light ring is a transparent, at least translucent, hollow-cylindrical body of glass, Plexiglas, or the like. On the upper end face the light emitters 27 are arranged in a certain distribution. This distribution permits defining the illumination of the viewing field. The light beams penetrate the light ring 26 in the axial direction, and exit from an opposite end face 29. In the region of this end face 29, the light ring is shaped such that its surface faces the viewing field, and forms an annular surface in the shape of a conical shell. In the holder 31, below end face 29, a reflection ring 30 is arranged, without impeding the light incidence from end face 29 onto the viewing field. The reflection ring 30 possesses an inner circumferential surface, which forms likewise an annular surface in the shape of a conical shell in facing relationship with the viewing field of the supply meter. However, this annular surface has a different angle of inclination. The light exiting from the end face (exit surface) 29 of the light ring with a certain inclination toward the viewing area has the advantage that the light beams strike the viewing area substantially not perpendicularly. This prevents not only a shadow formation, but also the reflection of the light in the direction of the light ring.

FIGS. 9a–d are detail views of a plurality of configurations of light rings.

Figure 9A:
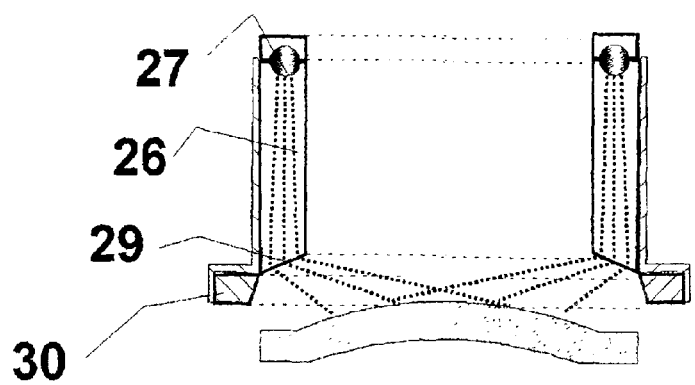
FIGS. 9A–9D are detailed views of light rings.

In the embodiment of FIG. 9a, the exit surface 29 faces the inspection window such that the light beams do not reflect from this surface, but exit and, in so doing, refract, so that they strike the inspection window.

Figure 9B:
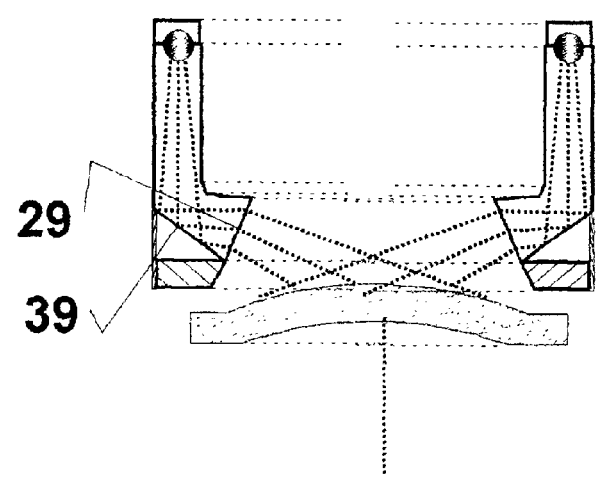
Figure 9C:
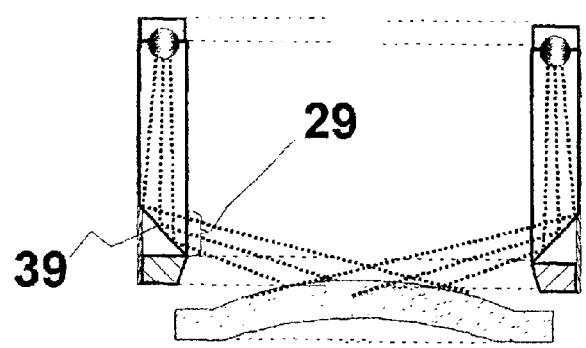
Figure 9D:
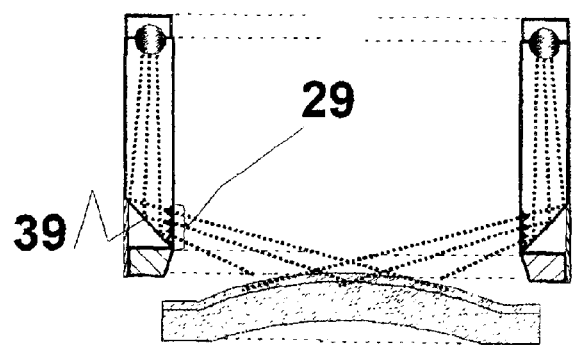

The same applies to the embodiments of FIGS. 9b–d. However, each embodiment of FIGS. 9B–9D includes a reflection surface on the light ring, upon which the light beams impinge, and from which they are projected back into the light ring, so that they impinge upon the exit surface at a favorable angle. This angle is selected by the different relative positions of the reflection surface to the exit surface, which is exemplary in the figures, so that the light beams emerge from the exit surface completely though, but with a refraction directed toward the inspection window. In FIG. 9d, the exit surface is additionally provided with prismatic, annular grooves, which permit further influencing of the refraction and deflection of the light beams. As regards the configuration of FIGS. 9c–d, it is further noteworthy that the exit surface is the lower part of the circular-cylindrical inner shell of the annular ring, which is made possible by a skillful arrangement of the reflection surface.

The inclination of the annular reflection surface of reflection ring 30 is selected such that the light beams, which emanate from the end face 29 of the light ring, and which are reflected on inspection window 3, are again reflected on the reflection surface of reflection ring 30 to the inspection window, and then contribute to the illumination of the viewing field due to the changed angle of incidence. FIG. 6 shows on the left a light beam which leaves end face 29, and is reflected by reflection on the inspection window or viewing field of the supply meter directly to the optical system 7 of the image reader. On the right side, a light beam is shown which emanates from end face 29, and is first reflected on inspection window 3 to the annular reflection surface of the reflection ring. Only then is it used for illuminating the viewing field.

As is further shown in FIG. 6, but generally advantageous in all embodiments, a shutter 28 precedes the optical system with lens 7 of the image reader. Other than is usual in a camera, this shutter is arranged not between the lens and the photosensitive receiver 8, but between the lens and the object being recorded. This shutter 28 serves the purpose of eliminating rays in the edge regions of the lens, which tend to scatter in particular, and thus fail to produce clear images.

Consequently, the shutter 28 is used to display the numerals and other characters with a high definition, and to make them recognizable.

Moreover, it will also serve this purpose when light of a special color, and in particular also light of a narrow wave range, is produced (monochromatic light). To this end, the light sources on the one hand and photosensitive receivers 8 on the other hand are adapted to one another, so as to produce and receive only light of a certain wave length. Especially suited are green shades or yellow shades, in particular for water meters, since light of this wave range penetrates water especially well. Not only monochromatic light, but also polarized light have the advantage that a uniform, even refraction occurs, so that stray light is avoided with a defined adjustment of the image reader.

Yet, it cannot be avoided that the receiver registers the individual image points of the viewing field with unclear brightness values. The transitions between insignificant portions of the viewing field and the there displayed numerals and characters are flowing. With the use of a microprocessor, which forms a part of the computer or image reader, it is possible to accomplish that image points which exceed a certain brightness value (white level) are always displayed in white or in another way as bright, and that image points which exceed a certain darkness value (gray scale value) are always displayed dark, in particular in black. In this manner, it is possible to make with the use of the image reader the recorded image substantially clearer than it is in reality.

Figure 7:
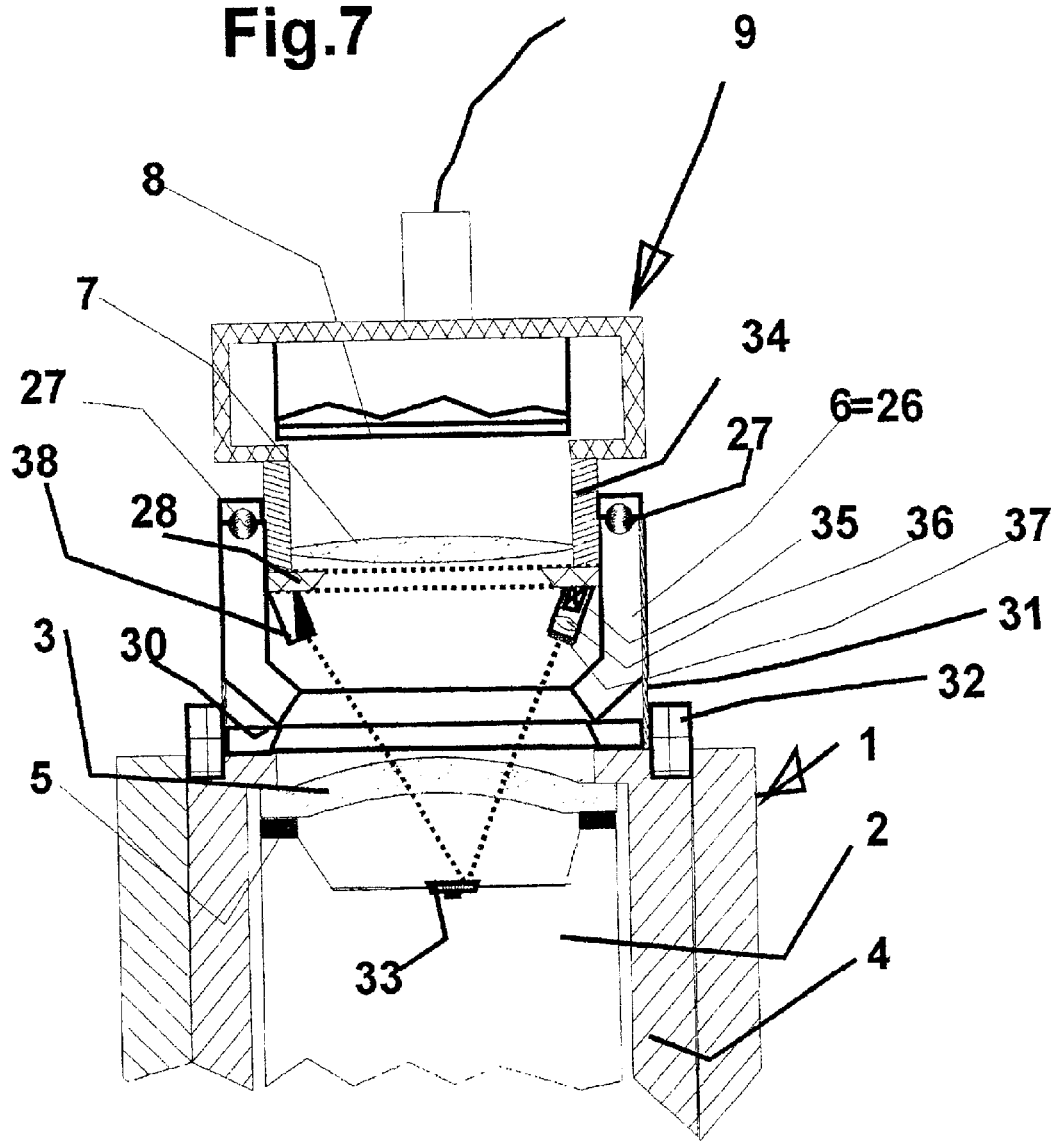
FIG. 7 is a sectional view of an image reader, guide system, and consumption body with an additional light source, and a supply meter with a control wheel.

As shown in the embodiment of FIG. 7, it is also possible to integrate a device which permits monitoring the proper operation of the supply meter. To this end, water meters have control wheels which are put into motion by the water flow, and whose rotation and rotational speed indicate that the water consumption is registered. Such a control wheel (impeller wheel 33) is shown in the viewing area of the water meter of FIG. 4. In the embodiment of FIG. 7, this impeller wheel 33 is scanned by the light beams of a control lamp 38, which may be, for example, a diode, transmitter diode, or light-emitting diode. The light-emitting diode is directed toward the rotating surface of control wheel 33. The reflected light beams of the light-emitting diode are received by a photodetector 35. With a focusing lens 36 and an optical filter 37, the photodetector 35 is likewise directed to the surface of control wheel 33. Independently of the image reader, the photodetector 35 connects to a signaling device, which measures, for example, the frequency of light fluctuations. The frequency fluctuation results from the fact that the control wheel 33 has on its scanned surface markings in a certain spaced relationship. The detected frequency is a measure for the proper operation of the supply meter.

It is useful that the light beams of the light-emitting diode 36 have a different wave length than the light sources for illuminating the viewing field during the reading of the consumption values. This avoids mutual interferences. Such monitoring functions will be especially useful when the image reader is permanently installed on the supply meter. By way of a corresponding signaling, it will be possible to exchange the supply meter immediately, when a breakdown of its operation is signaled.

The device for scanning the control wheel is arranged on the previously described shutter ring, and precedes lens 7. This arrangement in this location permits arranging the device for monitoring the control wheel in very close relationship with the viewing field. This is advantageous, since only a small intensity of light is needed, and interferences are avoided. Interferences coming from the outside are prevented in particular in that the light ring and the cylindrical holder 31 surround the devices for scanning the control wheel.

The embodiments enable not only the reading of consumption values free of human errors, but also a simultaneous evaluation of the consumption value. In this connection, it will be especially advantageous when the camera and/or the computer also include an electronic storage, which permits permanently storing the identification mark or customer data, and intermittently the consumption value. In this connection, it should be remarked that it will also be possible to store the identification mark invariably and permanently in the camera, when same is stationarily mounted on the supply meter. In this instance, a special identification mark is not needed on the supply meter. Moreover, the storage of at least the last consumption value will make it possible to also compute the consumption value simultaneously with the next reading of the count. After the computation, the oldest meter count (consumption value) may be erased. This procedure makes it also possible to issue at the same time, when the count is read, a voucher, for example, a bill for the consumption to the customer, who is identified by the identification mark.

The invention makes it possible to show on a display the consumption values of the reading location. These values may then be taken over by the operator. Furthermore, it is possible to transfer the consumption values from the reading location to the storage of a computer that is carried along by the operator. After reading a plurality of supply meters, the consumption values may then be transferred to a central computer, which is in charge of the computation of the consumption, as well as the payment thereof, as well as the writing of bills.

The herewith realized advantages relate in particular to operations from reading to inputting the consumption values in the central computer.

However, a substantially more extensive streamlining is accomplished in that the carry-on computer is also set up for storing preceding consumption values with the inclusion of the respective identification numbers. It will therefore be very advantageous when the computer is also equipped with an output device, in particular a printer. This will make it possible to compute, in situ, without the aid of the central computer, the consumption and the payment therefor, and to write a bill to the respective consumer. Via telephone or other telecommunication lines, it will also be possible to debit directly the bank account of the customer by way of an online accounting of the payment for the consumption.

Likewise, the embodiment of FIG. 8 shows a supply meter of the present invention, which is used in a hard-to-access location. In essence, its description corresponds to that of FIG. 5. Likewise in this embodiment, the water meter is permanently equipped with an image reader 9 with an interposed guide system 6. The guide system 6 is a conical shell, which is placed with its lower end face in hermetically sealed relationship on the water meter, and which mounts the image reader in hermetically sealed relationship on its upper end face, thus forming a hermetically sealed unit, which prevents penetration of humidity and dirt.

The image reader is connected via a cable 11 to a display 39. The display 39 is stationarily mounted in the upper region of a manhole or outside thereof. However, it may also be portable. In this instance, the cable mounts at its end an adapter, which can be coupled with the display. A structural unit 40, in which the display is integrated, includes a battery 21 as an energy storage device. This battery is used to supply the image reader 9 and display 39. The structural unit 40 further includes an adapter, in which a support 41 may be inserted such that it has an accurately defined position relative to the display 39. A further camera (transmission camera) 42 may be mounted to the free end of support 41. This camera is a normal camera, whose receiving carrier is however adapted to the light beams used by the display.

FIG. 8a is an enlarged view of the structural unit and the transmission camera. The support can be pivoted by means of a hinge to its operating position or to the side. It is important that the support also includes a protective cylinder 47, which surrounds in the operating position of the support the camera 42, when installed, and protects it against extraneous light. The protective cylinder may also accommodate a filter 48, which is adapted to the light emitted by display 39. By means of this filter, it is possible to realize a binary conversion of the signals coming from the display, so that the transmission camera receives their light signals only as "existing" or "nonexistent." Both the image recording device 9 and the transmission camera 42 are always identically adjusted and focused. With that, it is possible to ensure that the recordings occur always fast and always of the same quality.

The operator can activate the energy supply and the connection to the image reader 9 on the structural unit 40 by means of a switch 46. As a result, the read data of the water meter appear on the display 39. The display is then photographed by the transmission camera 42. The recorded image of the display may then be digitized and directly transmitted, for example, by a portable radio set 20 to a remote computer 22. In the illustrated embodiment, the remote computer 22, which is not shown, is provided with a scanner. The image produced by the camera 42 is thus read into the computer, so that the computer is able to evaluate the read data of the water meter and prepare a bill for the consumption.

The structural unit, or alternatively the image recording device, may be provided with a storage and a timing device. The timing device permits reading the water meter at predetermined times, for example, at the first of each month, and storing the read data. In this case, the stored data are shown on the display 39 by activating the structural unit, and then transferred to the transmission camera.

The display is shown in FIG. 8b. The display includes not only an image component, but also, within the recording range of the transmission camera, a control display 43, in which light signals 44 are able to display the status of the counter, and/or a sequence of numerals 45 as the code number for the water meter. Likewise, these data are photographed by the transmission camera 42 and subsequently read into the computer.

In the same way as in the embodiment of FIG. 6, the present embodiment also permits illuminating the viewing field under the inspection window 3 of a water meter in a very uniform manner and adapted to the conditions. The description of FIG. 6 is herewith incorporated by reference.

What is claimed is:

1. A supply meter system, comprising:
   a supply meter for measuring a consumption value and including a viewing field for alphanumerically displaying the measured value in an optically readable form, with the viewing field having an optical configuration and an optical situation;
   a frame that is in the form of hollow shell having opposite first and second ends, with the first end adapted to a surface of the supply meter and placed thereon so that the shell extends around the viewing field;
   an image reader for obtaining an image of the viewing field, wherein the image reader includes a camera mounted to the second end of the shell, with the camera having an optical system that is adapted to the optical configuration and the optical situation of the viewing field, wherein the shell produces a predetermined spacing between the camera and said surface of the supply meter, the shell establishes an orientation of the optical system of the camera toward the viewing field, and the shell extends around the optical system;
   a light source for illuminating the viewing field, wherein the light source is positioned above the viewing field by the shell and the shell extends around the light source; and
   a display connected to the camera for displaying the image of the viewing field.

2. A supply meter system according to claim 1, wherein the shell is cylindrical.

3. A supply meter system according to claim 1, wherein the viewing field is positioned behind an inspection window of the supply meter, the inspection window includes a lens, and optical properties of the lens and geometric relations between the lens and the viewing field define the optical configuration and the optical situation of the viewing field.

4. A supply meter system according to claim 1, wherein the viewing field is positioned behind an inspection window of the supply meter, and the supply meter, the image reader, and the shell form a hermetically sealed, watertight, and dust-proof unit that is positioned above the inspection window.

5. A supply meter system according to claim 1, further comprising a second camera mounted to a support so that the second camera is in a predetermined position above the display for recording data shown on the display.

6. A supply meter system according to claim 5, wherein the support connects to a protective cylinder, the protective cylinder surrounds the second camera in its predetermined position and the display, and the protective cylinder shields the second camera and the display from extraneous light.

7. A supply meter system according to claim 1, wherein the camera is a digital camera that is operative for recording and storing the image of the viewing field of the supply meter.

8. A supply meter system according to claim 7, wherein the optical system of the digital camera includes a lens, and the supply meter system further includes a shutter that is positioned between the lens and the viewing field of the supply meter, and the shutter is for limiting detail of the image that is recorded and stored by the digital camera.

9. A supply meter system according to claim 1, wherein the supply meter is a water meter that includes a glass cover through which the consumption value is seen as a line of numerals on the viewing field, which is immersed in water.

10. A supply meter system according to claim 9, wherein the image reader further includes a light-sensitive photodetector, which is directed toward a movable surface with markings located behind the glass cover, and a microprocessor connected to the photodetector and including a comparator, wherein the photodetector and microprocessor are operative for detecting at predetermined time intervals a change in position of the movable surface, wherein a moving speed of the movable surface is a function of the amount of consumption determined by the supply meter, and a frequency of light pulses generated by the markings is a function of the amount of consumption determined by the supply meter.

11. A supply meter system according to claim 10, wherein the light source is a first light source, and the movable surface is illuminated by a second light source.

12. A supply meter system according to claim 1, wherein the light source includes at least one light emitter and at least a portion of the shell that is in the form of a hollow light ring of a transparent or translucent material which surrounds the optical system of the camera in a substantially concentric relationship, with the light ring including an end face, which faces the camera, and an exit surface, which faces the viewing field of the supply meter, and the light emitter is on top of the end face for radiating light beams into the light ring, with the exit surface of the light ring sloping toward the viewing field of the supply meter in such a manner that light beams exit from said exit surface and strike the viewing field.

13. A supply meter system according to claim 12, wherein the light ring is cylindrical.

14. A supply meter system according to claim 12, wherein the end face of the light ring is annular, and a plurality of light emitters are circumferentially distributed over the end face of the light ring in such a manner that adjusting illumination of the viewing field according to needs by corresponding arrangements of the light emitters on the end face of the light ring is possible.

15. A supply meter system according to claim 12, wherein a plurality of light emitters are evenly circumferentially distributed over the end face of the light ring.

16. A supply meter system according to claim 12, wherein a reflector ring is between the light ring and the viewing field, the reflector ring includes a conical reflector surface that is facing the viewing field and arranged in concentric relationship with the light ring, and the reflector ring serves as at least a part of the frame.

17. A supply meter system according to claim 12, wherein the light source includes a plurality of light emitters that provide light of a limited wave range such that the light is substantially monochromatic and includes green or yellow light.

18. A supply meter system according to claim 12, wherein the supply meter includes a glass cover and the viewing field is positioned behind the glass cover.

19. A supply meter system according to claim 18, wherein the exit surface slopes toward the glass cover in such a manner that the light beams exiting from said exit surface hit the glass cover at a predetermined angle of incidence that takes into account the refraction on the glass cover so that the light penetrates the glass cover substantially free of reflections.

20. A supply meter system according to claim 18, wherein a reflection surface is on an end of the light ring that faces the glass cover, the reflection surface reflects the light beams, and the reflection surface slopes toward the glass cover such that the light beams in the light ring are projected on the exit surface of the light ring at a substantially acute angle.

21. A supply meter system according to claim 18, wherein the exit surface of the light ring includes annular grooves with a prismatic axial section for refracting the emerging light beams in the direction of the glass cover of the supply meter.

22. A supply meter system according to claim 18, wherein between the light ring and the viewing field of the supply meter, a reflector ring with a conical reflector surface facing the viewing field is arranged in concentric relationship with the light ring, and inclined in such a manner that the light beams emerging from the exit surface and striking the reflector surface are reflected toward the glass cover.

23. A supply meter system according to claim 18, wherein a reflector ring is between the light ring and the viewing field, the reflector ring includes a conical reflector surface that is facing the viewing field and arranged in concentric relationship with the light ring, and inclined in such a manner that any light beams that are reflected from the glass cover are reflected by the reflector surface toward the glass cover.

24. A supply meter system according to claim 1, wherein the image reader is connected to a computer.

25. A supply meter system according to claim 24, wherein the image reader is connected to the computer via a wireless communication system selected from the group consisting of: a radio communication system, an ultrasound communication system, and an infrared communication system.

26. A supply meter system according to claim 24, wherein the computer is a central computer that is positioned remotely from the supply meter, and the central computer is capable of being contemporaneously connected a plurality of image readers.

27. A supply meter system according to claim 24, wherein the computer comprises a program and an outputting device for carrying out a money transfer by remote debiting.

28. A supply meter system according to claim 24, wherein the image reader is provided with a time-dependent switch, which is used to activate the image reader and the illumination of the viewing field of the supply meter for reading current data of the supply meter.

29. A supply meter system according to claim 24, wherein the supply meter includes an inscription for identifying the location of the supply meter, and the image reader is provided with means for recording, transferring and reading into the computer signals representing the inscription which identifies the location of the supply meter.

30. A supply meter system according to claim 24, wherein the computer is equipped with a program for an alphanumerical evaluation of images of alphanumerical characters obtained by the image reader.

31. A supply meter system according to claim 30, including:
- a memory for storing the images of alphanumerical characters in the form of digital signals;
- means for comparing the digital signals of an image for correspondence with stored signals of all alphanumerical characters; and
- means for outputting an alphanumerical character as a consumption value of a reading location in the form of the electronic signal train of that alphanumerical character whose stored image corresponds with the read image.

32. A supply meter system according to claim 24, wherein the image reader is connected to a data storage for storing alphanumerical data contained in the image of the viewing field.

33. A supply meter system according to claim 32, including:
- means for storing a first and a second reading time;
- means for transferring and reading into the computer a sequence of signals, which represent information selected from a group consisting of a consumption value and identification data of a reading location at the first and the second reading time;
- a program for an alphanumerical evaluation of read customer data of the first and the second reading time with a storage for storing the alphanumerically evaluated customer data of the first and the second reading time;
- a second reading of information selected from a group consisting of a consumption value and identification data of the reading location on the supply meter after expiration of a reading time interval; and
- means for comparing the alphanumerically evaluated customer data of the first and the second reading time and for computing a consumption between the first and the second reading time of the former and the current consumption value.

34. A supply meter system according to claim 33, including time measuring means for determining the first and the second reading time.

35. A supply meter system according to claim 33, including means for outputting a written consumption voucher in the amount of the consumption.

36. A supply meter system according to claim 35, wherein the storage of the data occurs in the computer, which is associated in spatially close relationship with the image reader, and which includes connection elements for connecting to a communication network.

37. A supply meter system, comprising:
- a supply meter for measuring a consumption value and including a viewing field for alphanumerically displaying the measured value in an optically readable form, with the viewing field having an optical configuration and an optical situation;
- a frame that is in the form of a hollow shell having opposite first and second ends, with the first end adapted to a surface of the supply meter and placed thereon so that the shell extends around the viewing field;
- a scanner mounted to the second end of the shell for obtaining an image of the viewing field by way of a point-by-point recording and storage of the image, with the scanner having an optical system that is adapted to the optical configuration and the optical situation of the viewing field, wherein the shell produces a predetermined spacing between the scanner and said surface of the supply meter, the shell establishes an orientation of the optical system of the scanner toward the viewing field, and the shell extends around the optical system;
- a light source for illuminating the viewing field, wherein the light source is positioned above the viewing field by the shell and the shell extends around the light source; and
- a display connected to the scanner for displaying the image of the viewing field.

38. A supply meter system, comprising:
- a supply meter for measuring a consumption value and including a viewing field for alphanumerically displaying the measured value in an optically readable form, with the viewing field having an optical configuration and an optical situation;
- a guide system on the supply meter;
- an electronic image reader positioned above the viewing field by the guide system for obtaining an image of the viewing field, with the image reader having an optical system that is adapted to the optical configuration and the optical situation of the viewing field;
- a display connected to the image reader for displaying the image of the viewing field; and
- a light source for illuminating the viewing field, with the light source including at least one light emitter and a hollow light ring of a transparent or translucent material which surrounds the optical system of the image reader in a substantially concentric relationship,
- wherein the light ring includes an end face, which faces the image reader, and an exit surface, which faces the viewing field of the supply meter, and the light emitter is positioned on the end face for radiating light beams into the light ring, with the exit surface of the light ring sloping toward the viewing field of the supply meter in such a manner that light beams exit from said exit surface and strike the viewing field.

39. A supply meter system according to claim 38, wherein the light ring is cylindrical.

40. A supply meter system according to claim 38, wherein the guide system includes the light ring.

41. A supply meter system, comprising:
- a supply meter for measuring a consumption value, and including a viewing field for alphanumerically displaying the measured value in an optically readable form, with the viewing field having an optical configuration and an optical situation;
- a guide system on the supply meter;
- a light source positioned above the viewing field by the guide system for illuminating the viewing field;
- an electronic image reader positioned above the viewing field by the guide system for obtaining an image of the viewing field, with the image reader having an optical system that is adapted to the optical configuration and the optical situation of the viewing field;
- a display connected to the image reader and operative for displaying the image of the viewing field; and
- a camera mounted to a support so that the camera is in a predetermined position above the display for recording data shown on the display.

42. A supply meter system, comprising:
- a supply meter for measuring a consumption value and including a viewing field for alphanumerically displaying the measured value in an optically readable form, with the viewing field having an optical configuration and an optical situation;

a guide system on the supply meter;

a light source positioned above the viewing field by the guide system for illuminating the viewing field;

a digital camera positioned above the viewing field by the guide system for obtaining an image of the viewing field, with the camera having an optical system that is adapted to the optical configuration and to the optical situation of the viewing field, and the optical system includes a lens;

a display connected to the image reader and operative for displaying the image of the viewing field; and a shutter positioned between the lens of the digital camera and the viewing field of the supply meter for limiting detail of the image of the viewing field.

43. A supply meter system, comprising:

a supply meter for measuring a consumption value and including a viewing field for alphanumerically displaying the measured value in an optically readable form, with the viewing field having an optical configuration and an optical situation;

a guide system on the supply meter;

an electronic image reader positioned above the viewing field by the guide system for obtaining an image of the viewing field, with the image reader having an optical system that is adapted to the optical configuration and the optical situation of the viewing field;

a light source positioned above the viewing field by the guide system for illuminating the viewing field;

a display connected to the image reader and operative for displaying the image of the viewing field;

means for storing a first and a second reading time;

means for transferring and reading into the computer a sequence of signals, which represent information selected from a group consisting of a consumption value and identification data of a reading location at the first and the second reading time;

a program for an alphanumerical evaluation of read customer data of the first and the second reading time with a storage for storing the alphanumerically evaluated customer data of the first and the second reading time;

a second reading of information selected from a group consisting of a consumption value and identification data of the reading location after expiration of a reading time interval; and means for comparing the alphanumerically evaluated customer data of the first and the second reading time and for computing a consumption between the first and the second reading time of the former and the current consumption value.

* * * * *